United States Patent [19]

Rink, Jr.

[11] Patent Number: 4,883,995

[45] Date of Patent: Nov. 28, 1989

[54] AUTOMATIC OIL DRAINING SYSTEM FOR GENERATORS

[75] Inventor: Frederick J. Rink, Jr., Danvers, Mass.

[73] Assignee: General Electric Company, Schenectady, N.Y.

[21] Appl. No.: 292,061

[22] Filed: Dec. 30, 1988

[51] Int. Cl.$^4$ .................. H02K 9/24; H02K 5/136
[52] U.S. Cl. ............................. 310/55; 137/204; 310/90; 384/479
[58] Field of Search ............... 137/204; 184/6.23; 384/479; 310/52, 53, 54, 88, 90, 102, 113, 55

[56] References Cited

U.S. PATENT DOCUMENTS

| 2,537,224 | 1/1951 | Lansdale et al. | 137/204 |
| 2,675,493 | 4/1954 | Grobel | 310/53 |
| 3,122,668 | 2/1964 | Cuny | 310/55 |
| 3,240,967 | 3/1966 | Kratchew | 310/55 |

FOREIGN PATENT DOCUMENTS 57-3547  1/1982  Japan ..................... 310/55

Primary Examiner—Patrick R. Salce
Assistant Examiner—D. L. Rebsch
Attorney, Agent, or Firm—Jerome C. Squillaro

[57] ABSTRACT

A fluid draining system for an electric power generator of the type containing a cooling gas under pressure includes oil-pressurized shaft seals adjacent the rotor bearings, to prevent the pressurized gas from escaping through the bearings. Oil is at a pressure higher than the pressurized gas and means are provided to automatically drain leakage oil from the bottom of the generator. The automatic drain includes a differential pressure valve with its first inlet connected to the drain in the bottom of the generator, its second inlet connected to the gas pressure within the generator, and its outlet completing the drain path for the system when the differential pressure of the first inlet exceeds that of the second inlet by a preset amount.

15 Claims, 2 Drawing Sheets

AUTOMATIC OIL DRAINING SYSTEM FOR GENERATORS

BACKGROUND OF INVENTION

This invention relates to an automatic oil draining system for use in large turbo machinery having internal gas under pressure such as electric power generators; and more particularly to such a system utilizing (1) pressurized oil to prevent the pressurized gas from escaping to the external environment and (2) pressurized water to cool the electrical stator coils.

Hydrogen gas under pressure is commonly utilized within large electric power generators to cool the stator core and the rotor coils because of the improved cooling capabilities of hydrogen as contrasted with air. In order to keep the gas from leaking to the external environment through the bearings, oil fed hydrogen seals are utilized on the shaft adjacent to the bearings. The oil pressure within the seals is deliberately kept at a pressure higher than the gas pressure within the generator to prevent the potentially flammable and explosive hydrogen from leaking out. Since this pressure differential creates the possibility of the oil leaking through the seals into the generator, oil deflectors are provided to direct the leaked oil to an external sump for drainage. Under normal circumstances deflectors completely prevent any oil from entering the region within the generator. However, there have been instances where the deflectors were not 100% effective, allowing some leakage. Oil leakage into the internal regions of the generator can cause forced outages or shutdown of the generator if it were allowed to accumulate.

Oil entering the generator collects in the lower regions of the generator. A drain line is normally provided in the lower frame extension of the generator which houses the high voltage bushings, to collect the oil which enters the generator, along with any potential water leakage if the generator is water cooled. A liquid detector located within this drain line provides a signal or alarm when fluid accumulates in the drain line. The operator or plant maintenance personnel then manually drain the drain line to remove the oil and water if present.

For various reasons beyond the control of the manufacturers of turbine-generators, operators and plant maintenance personnel sometimes fail to respond to such signals or alarms and do not empty the drain lines, which can result in forced outages, generator down time and possible generator damage.

OBJECTS AND SUMMARY OF INVENTION

It is an object of the present invention to provide an improved fluid draining system for an electrical power generator to prevent excess accumulation of fluids within the generator.

It is another object of the present invention to provide an improved automatic fluid draining system for an electrical power generator to drain fluids which may accumulate within the generator.

In carrying out the above and other objects of the present invention, the lower frame fluid drain line of an electrical power generator is connected to one inlet of an adjustable differential pressure relief valve, the other valve inlet is connected to the pressurized hydrogen inside the generator, and the outlet of the valve is connected to the fluid drain or storage container of the power plant. The valve is adjusted so that it will actuate or open and connect the drain line to the storage container when the pressure at the drain line inlet port exceeds the reference hydrogen pressure by a predetermined amount, and will close when the inlet port pressure is a predetermined lesser amount.

DESCRIPTION OF THE DRAWINGS

The novel features which are believed to be characteristic of the present invention are set forth with particularity in the appended claims. The invention itself, both as to its organization and method of operation, together with further objects and advantages thereof may be best understood by reference to the following description taken in conjunction with the accompanying drawings wherein:

Referring to FIG. 1, there is shown an electrical power generator 1 including a frame or shell 2 having a rotor 3 rotatably mounted and supported within the frame 2 by bearings at either end of the frame, one of which is shown at 4. The generator 1 is of conventional design, and may be of the many types available from General Electric Company. The bearings 4 are supported at the ends of the frame 2 and in turn support the shaft 5 of the rotor 3 such that the rotor may be rotated by a source of motive power such as a turbine (not shown) coupled to the shaft 5. The bearings 4 are supplied with lubricating oil (not shown) in various manners well known in the art. Shaft seals 6 surround the shaft 5 inboard (closer to the interior of the generator), and adjacent to, the bearings 4. The bottom of the frame 2 has a lower frame extension 7 comprising depending walls 8 and bottom 9 which form a generally rectangular chamber extending parallel to the rotor 8 below the bearings 4 and shaft seals 6. The interior of the frame 2 is supplied with hydrogen gas under pressure for cooling purposes from hydrogen source 15 through hydrogen line 16 which passes through opening 17 in housing 2. Oil 19 is vacuum treated to remove bubbles and is pumped under pressure from oil reservoir 10 containing oil 19 through line 11 by oil pump 12 and through line 13 to deliver oil to the seals 6. The pressure of the oil supplied by pump 12 is greater than the pressure of the hydrogen supplied by hydrogen source 15 to prevent leakage of the hydrogen gas through the bearings 4 to the exterior of housing 2.

Figure 1:
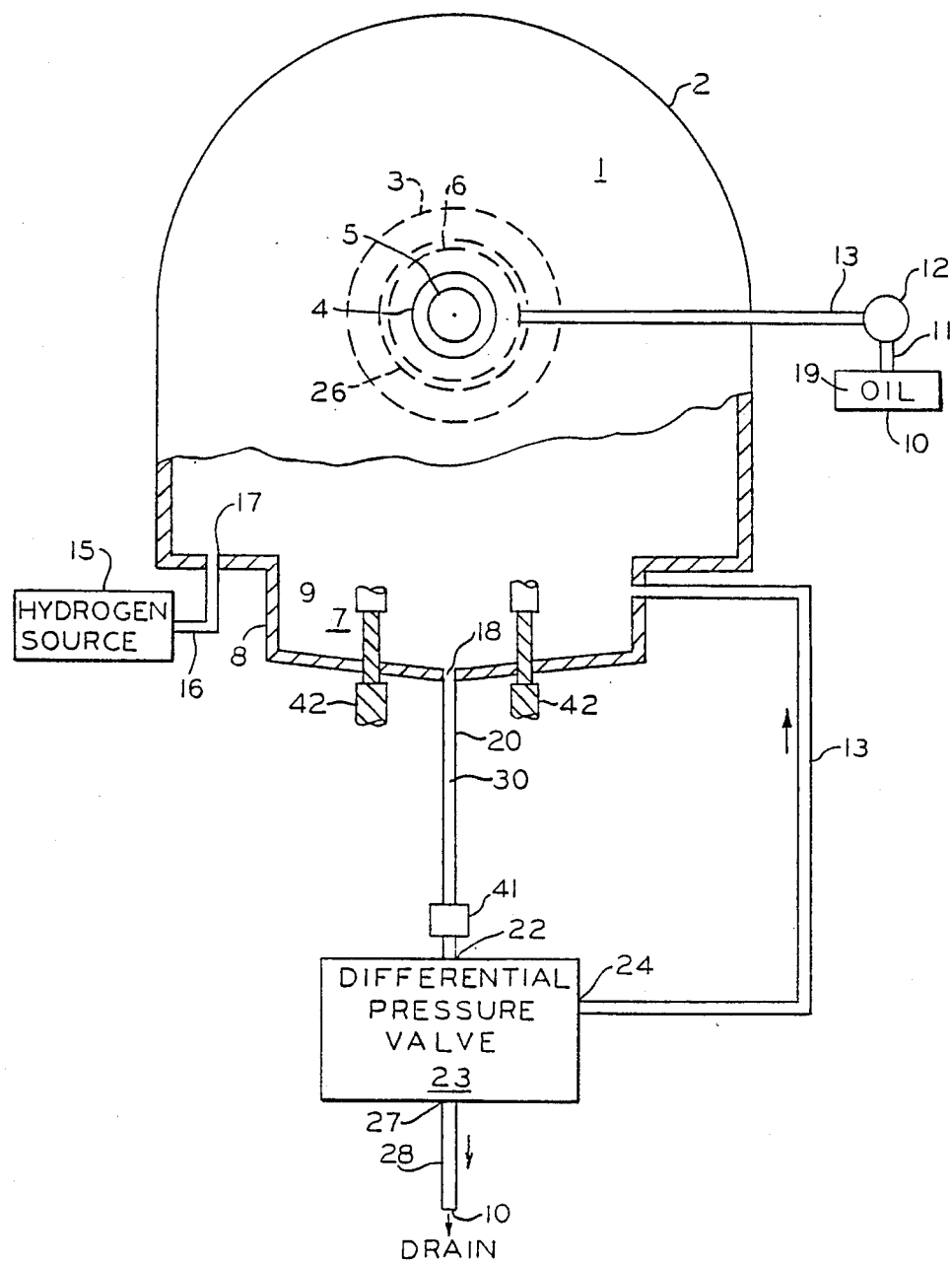
FIG. 1 is a simplified diagram of an electrical power generator fluid drain system utilizing the present invention.

The shaft seal 6 includes two floating segmented rings with the pressurized oil 19 from pump 12 being fed between the segmented rings, providing an oil flow in both directions along the rotating shaft 5 from these seals. To prevent oil 19 flowing inward from entering the internal regions of the power generator 1, oil deflectors 26 are utilized inboard of the seals 6. The deflectors 26 are generally very effective in blocking oil from entering the interior of the generator 1. However, there have been some instances when oil 19 has leaked past the deflectors 26. This oil is allowed to gravity drain to the lower frame extension 7. Six high voltage bushings, two of which are shown at 42, connect the output voltage of the generator through the frame 2 for connection to the power lines or load (not shown). The high voltage bushings 42 have internal gas cooling passages (not shown) which could be blocked by the oil if it were allowed to accumulate, resulting in overheating, possible arcing, and forced outages or shutdown of the generator 1. To overcome this problem a drain is provided in the bottom region 9 of the lower frame extension 7. Opening 18 connects the lower frame extension 7 through drain line 20 and through filter 41, which removes any particles, to the first inlet 22 of differential pressure valve 23. The bottom 9 of the lower frame extension 7 may include ribs (not shown) to define channels for directing the oil to the drain line 20. Alternatively, the bottom 9 of the lower frame extension 7 could be slightly sloped toward the drain line 20. The second inlet 24 of the differential pressure valve 23 is connected by line 13 into the upper region of the lower frame extension 7, a "dry" area within the frame 2 whereby the hydrogen gas pressure within frame 2 is applied to the second inlet 24 of the differential pressure valve 23. The outlet 27 of differential pressure valve 23 is connected through line 28 to the oil drain 10.

The differential pressure valve 23 is adjustable such that at the preselected pressure differential between the oil drain line 20 and the pressure of the hydrogen within the generator 1 as applied to the first and second inlet ports 22 and 24 respectively, and acting against the spring bias force within the differential pressure valve 23 actuates the valve to connect the drain line 20 through the valve 23 to the line 28 draining the oil from oil line 20. The differential pressure valve 23 is adjusted, for example to be actuated to drain the oil 9 from the drain line 20 whenever the oil plus gas pressure at the first inlet 22 exceeds the gas pressure at the second inlet 24 by 3 PSIG. This will occur when the oil in the drain line 20 is more than 84 inches high for oil 19 of the type which is commonly used in electric power generators.

Figure 2:
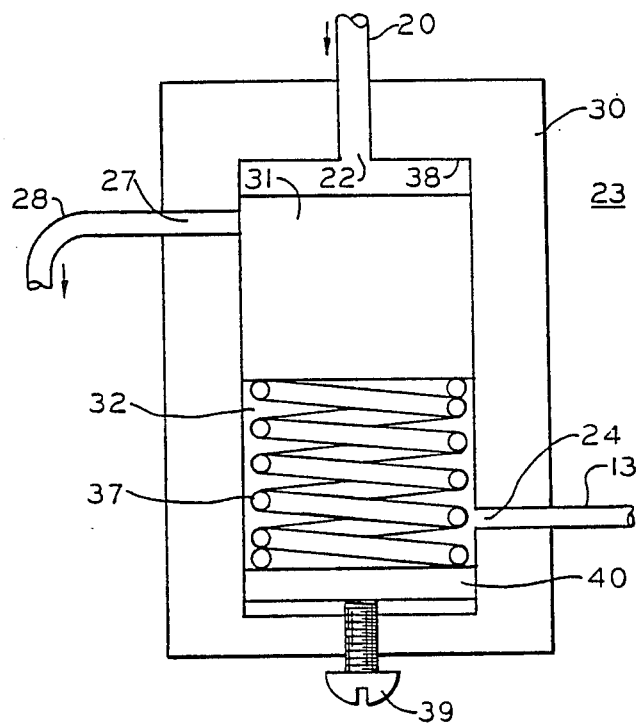
FIG. 2 is a schematic illustration of the construction of a typical differential pressure valve which is useful in explaining the operation of the present invention.

The operation of the differential oil pressure valve 23 may be best understood with reference to FIG. 2 which is a simplified schematic representation of such a valve. Referring to FIG. 2, the differential pressure valve 23 includes a housing 30 having a first inlet port 22 connecting oil drain line 20 to the top of spool or valve 31 which is slidably fitted within the cylindrical chamber 32 formed within housing 20. A second inlet port 24 is connected through gas line 13 which connects the central region of chamber 32 below spool 31 to the hydrogen gas pressure within the electric power generator 2. The outlet port 27 of the differential pressure valve 23 is connected to drain line 28. A coil spring 37 normally biases spool 31 against the top surface 38 of chamber 32. The coil spring 37 may be adjusted by adjusting screw 39 which moves adjustment plate 40 against coil spring 37.

Thus, the pressure exerted by the drain oil 19 plus the hydrogen gas pressure within the frame 2 of electric power generator 1 is applied to the top of spool 31 to force it downward against the bias of coil spring 37. However, the hydrogen gas pressure within the frame 2 of electric power generator 1 is also applied through the second inlet port 24 to the bottom of spool 31 tending to force the spool upward against the pressure applied downward to the top of the spool 31. Thus, when the downward pressure of the drain oil exceeds the preset pressure determined by the adjustable coil spring assembly 37, 39 and 40, the cylindrical member 34 of the spool 31 is moved downward to uncover the outlet port 27 and to connect the first inlet port 22 to the outlet port 27 allowing the drain oil to flow from the oil drain line 20 through the chamber 32 above spool 31 out through the outlet port 27 and line 28. When sufficient oil has drained from the oil drain line 20 the pressure of the oil against spring 37 decreases such that spool 31 has moved upward as the oil drains sufficiently for spool 31 to cover the outlet port 27 and disconnect the oil drain line 20 from line 28 resetting the differential pressure valve 23 to be automatically actuated again when a predetermined amount of oil 6 collects in the oil drain line 20.

It is to be appreciated that the differential pressure valve 23 will operate at its preset reference or amount of oil in oil drain line 20 over a range of gas reference pressures. The operators of large synchronous generators can reduce the pressure of the hydrogen cooling gas as the electrical load on the generator is reduced. This may be done to reduce windage loss in the generator at such loading. However, since the operation of the present invention is based upon an arrangement in which one input of the differential pressure valve is hydrogen gas pressure and the other input is hydrogen gas pressure plus the pressure of the column of oil in oil drain line 20, the actuation of the differential pressure valve 23 is essentially independent of the hydrogen gas pressure. That is, the actuation of the valve 23 may be expressed as follows:

Differential Pressure=(gas pressure+oil drain line pressure)−gas pressure=oil drain line pressure.

Accordingly, setting the differential pressure valve 23 for actuation by a given amount of oil in the drain line, or oil drain line pressure, will be effective over a range of hydrogen gas pressures without the need to readjust the differential pressure control.

The spring bias within the differential pressure valve 23 will, for example, automatically close the valve whenever the inlet pressure at the first inlet 22 is less than 2 PSIG or 54 inches of oil 6 in oil drain line 20.

The oil drain line 20 may include a transparent or glass section so that the level of oil 20 may be visually determined and the differential pressure valve 23 adjusted to operate at that level.

Also, while the present invention has been described with relation the draining of oil from the turbine, it is equally applicable to draining a mixture of oil and water in those turbines which also include water cooling.

The automatic oil draining system is versatile and adaptable to other uses. For example, it may be used in the seal oil systems of centrifugal compressors used for the gas boosting of natural gas. Thus, while the present invention has been described with respect to a certain preferred embodiment, it is to be understood that numerous variations in the details of construction, the arrangement and combination of parts, and the type of materials used may be made without departing from the spirit and scope of the invention.

What is claimed is:

1. In combination with a rotating machine such as an electric power generator having a housing containing a gas under pressure and bearings to rotatably support the shaft of the machine, an oil supply apparatus comprising;

shaft seals positioned on said shaft adjacent said bearings to maintain the gas within said machine;
    means to supply oil to said seals at a pressure above that of said gas to maintain said gas within said machine housing;

a fluid drain located within said machine below said shaft seals to enable draining of any leakage into the interior of said machine;

a differential pressure valve having a first inlet connected to said fluid drain;

a second inlet of said differential pressure valve connected to the gas pressure within said machine; and the outlet of said differential pressure valve being connected to said first inlet upon actuation thereof, whereby fluid is released from said fluid drain through said outlet of said differential pressure valve when the differential pressure of said first inlet exceeds that of said second inlet by an amount adequate to actuate said differential pressure valve.

2. The apparatus of claim 1 wherein deflectors are positioned adjacent said seals to block oil from the interior ion of said machine.

3. The apparatus of claim 2 wherein said gas under pressure is hydrogen provided for cooling purposes.

4. The apparatus of claim 3 wherein said second inlet of said differential pressure valve is connected through said machine housing to be exposed to the hydrogen gas pressure within said rotating machine.

5. The apparatus of claim 4 wherein a liquid is provided within said machine for cooling purposes.

6. The apparatus of claim 1 wherein said fluid drain is located in the bottom region of the lower frame extension of said housing.

7. The apparatus of claim 6 wherein said bottom region of said lower frame extension includes means to direct said fluid to said fluid drain.

8. The apparatus of claim 6 wherein the pressure differential which actuates said differential pressure valve is adjustable.

9. The apparatus of claim 8 wherein said pressure differential which actuates said differential pressure valve is approximately 3 PSIG.

10. The apparatus of claim 9 wherein said differential pressure valve once actuated to connect said fluid drain to said outlet is deactivated to disconnect said fluid drain from said outlet when said differential pressure falls below a predetermined value.

11. The apparatus of claim 10 wherein the said predetermined value of differential pressure is below 2 PSIG.

12. The apparatus of claim 11 wherein said fluid drain connected to said first inlet is in excess of 54 inches in height.

13. The apparatus of claim 4 wherein the pressure of said oil in said fluid drain on said first inlet actuates said differential pressure valve substantially independent of variations in the gas pressure in said machine.

14. The apparatus of claim 8 wherein the pressure of said fluid in said fluid drain actuates said differential pressure valve substantially independent of variations in the gas pressure in said machine.

15. The apparatus of claim 14 wherein said oil deflectors are positioned inboard of said shaft seals.

* * * * *